United States Patent
Mese et al.

(10) Patent No.: US 7,512,412 B2
(45) Date of Patent: Mar. 31, 2009

(54) POWER CONTROL AND OVERLAPPING CONTROL FOR A QUASI-ORTHOGONAL COMMUNICATION SYSTEM

(75) Inventors: Murat Mese, Rancho Palos Verdes, CA (US); Ayman Fawzy Naguib, Cupertino, CA (US); Arak Sutivong, San Diego, CA (US); Dhananjay Gore, San Diego, CA (US); Alexei Gorokhov, San Diego, CA (US); Tingfang Ji, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 573 days.

(21) Appl. No.: 11/158,587

(22) Filed: Jun. 21, 2005

(65) Prior Publication Data

US 2006/0211441 A1 Sep. 21, 2006

Related U.S. Application Data

(60) Provisional application No. 60/662,178, filed on Mar. 15, 2005.

(51) Int. Cl.
*H04B 7/00* (2006.01)
*H04Q 7/20* (2006.01)

(52) U.S. Cl. .................. 455/522; 455/453; 455/513; 455/63.1; 375/346; 375/260

(58) Field of Classification Search ............. 370/329, 370/310.1, 330, 341, 203, 252, 333; 375/296, 375/297, 346, 267, 260; 455/449–451, 452.2, 455/453, 127.1, 522, 464, 509, 513, 63.1, 455/67.11

See application file for complete search history.

(56) References Cited

U.S. PATENT DOCUMENTS 5,784,363 A 7/1998 Engstroem et al.

(Continued)

FOREIGN PATENT DOCUMENTS

JP 2003032218 A * 1/2003

(Continued)

OTHER PUBLICATIONS

Tomcik, "QTDD Performance Report 2," IEEE 802.20 Working Group on Mobile Broadband Wireless Access <http://ieee802.org/20/> Nov. 15, 2005, pp. 1-56, XP002386798.

*Primary Examiner*—Sujatha Sharma
(74) *Attorney, Agent, or Firm*—Mary Fales; Thomas R. Rouse

(57) ABSTRACT

Techniques for controlling transmit power and the amount of overlapping in a quasi-orthogonal system are described. A base station for a sector receives transmissions from terminals in that sector and neighbor sectors and determines performance metrics (e.g., overall throughput) and/or QoS metrics (e.g., minimum data rate) for the terminals in the sector. The base station updates an overlapping factor based on the performance metrics and updates a QoS power control parameter based on the QoS metrics. The overlapping factor indicates the average number of overlapping transmissions sent simultaneously on each time-frequency block usable for data transmission. The QoS power control parameter ensures that the terminals in the sector can achieve minimum QoS requirements. A power control mechanism with multiple loops is used to adjust the transmit power of each terminal. The overlapping factor and QoS power control parameter are updated by two of the loops.

43 Claims, 7 Drawing Sheets

U.S. PATENT DOCUMENTS

| | | | |
|---|---|---|---|
| 5,956,642 A * | 9/1999 | Larsson et al. | 455/449 |
| 6,751,444 B1 * | 6/2004 | Meiyappan | 455/69 |
| 2002/0077138 A1 | 6/2002 | Bark et al. | |
| 2007/0081491 A1 * | 4/2007 | Kim et al. | 370/329 |
| 2007/0258525 A1 * | 11/2007 | Jacobsen et al. | 375/260 |
| 2007/0286105 A1 * | 12/2007 | Kim et al. | 370/310.1 |
| 2008/0014980 A1 * | 1/2008 | Yano et al. | 455/522 |
| 2008/0031380 A1 * | 2/2008 | Takabayashi | 375/297 |
| 2008/0043880 A1 * | 2/2008 | Matsushita | 375/296 |
| 2008/0056181 A1 * | 3/2008 | Imamura et al. | 370/329 |

FOREIGN PATENT DOCUMENTS

| | | |
|---|---|---|
| WO | WO 2004/105294 | 12/2004 |

\* cited by examiner

POWER CONTROL AND OVERLAPPING CONTROL FOR A QUASI-ORTHOGONAL COMMUNICATION SYSTEM

CROSS REFERENCE

This application claims priority from Provisional Application No. 60/662,178, filed Mar. 15, 2005, entitled "Power Control And Overlapping Control For A Quasi-Orthogonal Communication System" and is assigned to the assignee of the present application, which is incorporated by reference in its entirety.

BACKGROUND

I. Field

The present disclosure relates generally to communication, and more specifically to data transmission and power control in a communication system.

II. Background

A multiple-access communication system can concurrently communicate with multiple terminals on the forward and reverse links. The forward link, also referred to as the downlink, refers to the communication link from the base stations to the terminals, and the reverse link, also referred to as the uplink, refers to the communication link from the terminals to the base stations. Multiple terminals may simultaneously transmit data on the reverse link and/or receive data on the forward link. This is often achieved by multiplexing the multiple transmissions on each link to be orthogonal to one another in time, frequency and/or code domain. Complete orthogonality among the multiple transmissions is typically not achieved in most instances due to various factors such as channel conditions, receiver imperfections, and so on. Nevertheless, the orthogonal multiplexing ensures that the transmission for each terminal minimally interferes with the transmissions for the other terminals.

The number of terminals that may be served simultaneously on each link is typically limited by the number of traffic channels available for data transmission, which in turn is limited by the available system resources. For example, the number of traffic channels is often determined by the number of available orthogonal code sequences in a code division multiple access (CDMA) system, the number of available frequency subbands in a frequency division multiple access (FDMA) system, the number of available time slots in a time division multiple access (TDMA) system, and so on. In many instances, it is desirable to allow more terminals to transmit data simultaneously in order to improve system capacity.

There is therefore a need in the art for techniques to support simultaneous transmissions for more terminals in a multiple-access communication system.

SUMMARY

Techniques for controlling transmit power and the amount of overlapping in a quasi-orthogonal multiple-access communication system are described herein. Overlapping refers to multiple transmissions sent on the same time-frequency block to a base station. Overlapping terminals are terminals using the same time-frequency block, and overlapping transmissions are transmissions sent on the same time-frequency block.

A base station for a sector in the system receives transmissions from terminals in the sector as well as transmissions from interfering terminals in neighbor sectors. The base station determines one or more metrics used for overlapping and power control. For example, the base station may adjust an overlapping factor to achieve good performance (e.g., high overall throughput) for the sector. The overlapping factor is indicative of the average number of overlapping transmissions sent simultaneously on each time-frequency block usable for data transmission. The overlapping factor may be used to schedule terminals for data transmission and for power control.

The base station may generate transmit power control (TPC) commands for each terminal in the sector. The TPC commands direct the terminal to adjust its transmit power such that a signal-to-noise-and-interference ratio (SNR) for the terminal is maintained at or near a target SNR. The base station may adjust a Quality of Service (QoS) power control parameter used to ensure that all terminals in the sector can meet QoS requirements. The base station may also estimate inter-sector interference observed by the base station from the terminals in the neighbor sectors and may generate an indication of the observed inter-sector interference. This indication may be in the form of a single other-sector interference (OSI) bit that indicates whether the observed inter-sector interference exceeds a nominal inter-sector interference threshold. The base station transmits the TPC commands to the terminals in the sector and may broadcast the OSI bit, the QoS power control parameter, and the overlapping factor.

A terminal receives the TPC commands for itself, the QoS power control parameter and the overlapping factor for its serving base station, and the OSI bits for the neighbor base stations. The terminal adjusts its transmit power based on all of these parameters to achieve good performance for itself, good performance for the serving base station, and acceptable inter-sector interference levels for the neighbor sectors.

The data transmission and power control techniques are described in detail below. Various aspects and embodiments of the invention are also described below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

Figure 1:
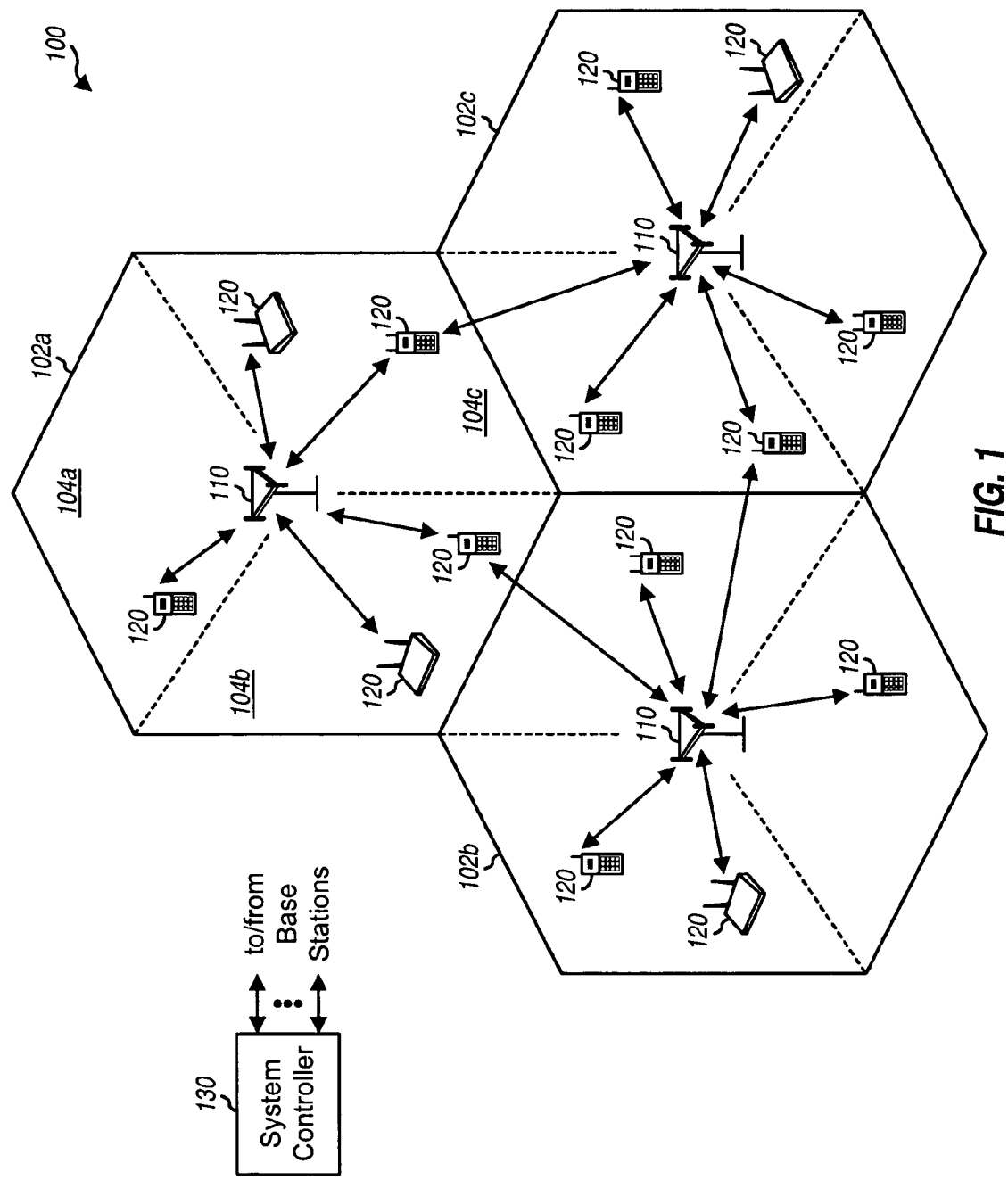
FIG. 1 shows a system with multiple base stations and multiple terminals according to an embodiment.

The word "exemplary" is used herein to mean "serving as an example, instance, or illustration." Any embodiment or design described herein as "exemplary" is not necessarily to be construed as preferred or advantageous over other embodiments or designs.

The data transmission and power control techniques described herein may be used for various multiple-access communication systems. For example, these techniques may be used for (1) a CDMA system that uses code division multiplexing (CDM) to send multiple transmissions for multiple terminals using different orthogonal code sequences, (2) an FDMA system that uses frequency division multiplexing (FDM) to send multiple transmissions on different frequency subbands, (3) a TDMA system that uses time division multiplexing (TDM) to send multiple transmissions in different time slots, (4) a spatial division multiple access (SDMA) system that uses spatial division multiplexing (SDM) to send multiple transmissions on different spatial channels, (5) an orthogonal frequency division multiple access (OFDMA) system, and (6) a single-carrier frequency division multiple access (SC-FDMA).

An OFDMA system utilizes orthogonal frequency division multiplexing (OFDM), which is a multi-carrier modulation technique that partitions the overall system bandwidth into multiple (K) orthogonal frequency subbands. These subbands are also called tones, subcarriers, bins, frequency channels, and so on. Each subband is associated with a respective subcarrier that may be modulated with data. For OFDM, K modulation symbols to be sent on the K subbands in one OFDM symbol period are first transformed to the time domain with a K-point inverse fast Fourier transform (IFFT) to generate a transformed symbol containing K time-domain samples. The last C time-domain samples are then repeated to form an OFDM symbol containing K+C samples, where C is the cyclic prefix length. The modulation symbols are sent in the frequency domain with OFDM.

An SC-FDMA system may utilize (1) interleaved FDMA (IFDMA), which is also called distributed FDMA, or (2) localized FDMA (LFDMA), which is also called narrowband FDMA. IFDMA transmits data and/or pilot on subbands that are uniformly spaced apart across the K subbands. LFDMA typically transmits data and/or pilot on adjacent subbands among the K subbands. For IFDMA, N modulation symbols to be sent on N subbands in one IFDMA symbol period are first repeated multiple times to obtain K modulation symbols for the K subbands. A phase ramp may be applied to the K modulation symbols to send these symbols on the desired set of N subbands. The last C symbols after application of the phase ramp are then repeated to form an IFDMA symbol containing K+C symbols. For LFDMA, the N modulation symbols to be sent on N subbands in one NFDMA symbol period are first transformed to the frequency domain with an N-point fast Fourier transform (FFT) to obtain N frequency-domain values. These N frequency-domain values are mapped to the N subbands used for transmission, and zero signal values are mapped to the remaining K−N subbands. A K-point IFFT is then performed on the K frequency-domain and zero signal values to obtain K time-domain samples. The last C time-domain samples are then repeated to form an NFDMA symbol containing K+C samples. The modulation symbols are sent in the time domain with IFDMA and LFDMA.

For clarity, the techniques are described below for a specific quasi-orthogonal multiple-access communication system that uses quasi-orthogonal multiplexing (QOM), which is a combination of FDM, TDM and SDM. This system is also called a quasi-orthogonal division access (QODA) system.

FIG. 1 shows a QODA system 100 with multiple base stations 110 and multiple terminals 120 according to an embodiment. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, the base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. For simplicity, the term "base station" is used generically herein for both a fixed station that serves a cell and a fixed station that serves a sector.

A terminal may be fixed or mobile and may also be called a mobile station, a wireless device, a user equipment, or some other terminology. Each terminal may communicate with zero, one, or multiple base stations at any given moment. In the following description, the terms "terminal" and "user" are used interchangeably, and the terms "sector" and "base station" are also used interchangeably. Each cell is assumed to be composed of multiple sectors. A "serving sector" or "serving base station" is a sector/base station with which a terminal primarily communicates.

Each base station 110 is equipped with multiple antennas that may be used for data transmission and reception. Each terminal may be equipped with one or multiple antennas for data transmission and reception. The multiple antennas at each base station represent the multiple inputs (MI) for forward link transmissions and the multiple outputs (MO) for reverse link transmissions. If multiple terminals are selected for simultaneous transmission, then the multiple antennas for the selected terminals collectively represent the multiple inputs for reverse link transmissions and the multiple outputs for forward link transmissions.

The QODA system may define traffic channels to facilitate allocation and use of the available system resources. A traffic channel is a means for sending data over the air and may also be called a channel, a physical channel, a data channel, a transmission channel, and so on. Traffic channels may be defined for various types of system resources such as subbands, time intervals, code sequences, and so on.

Figure 2:
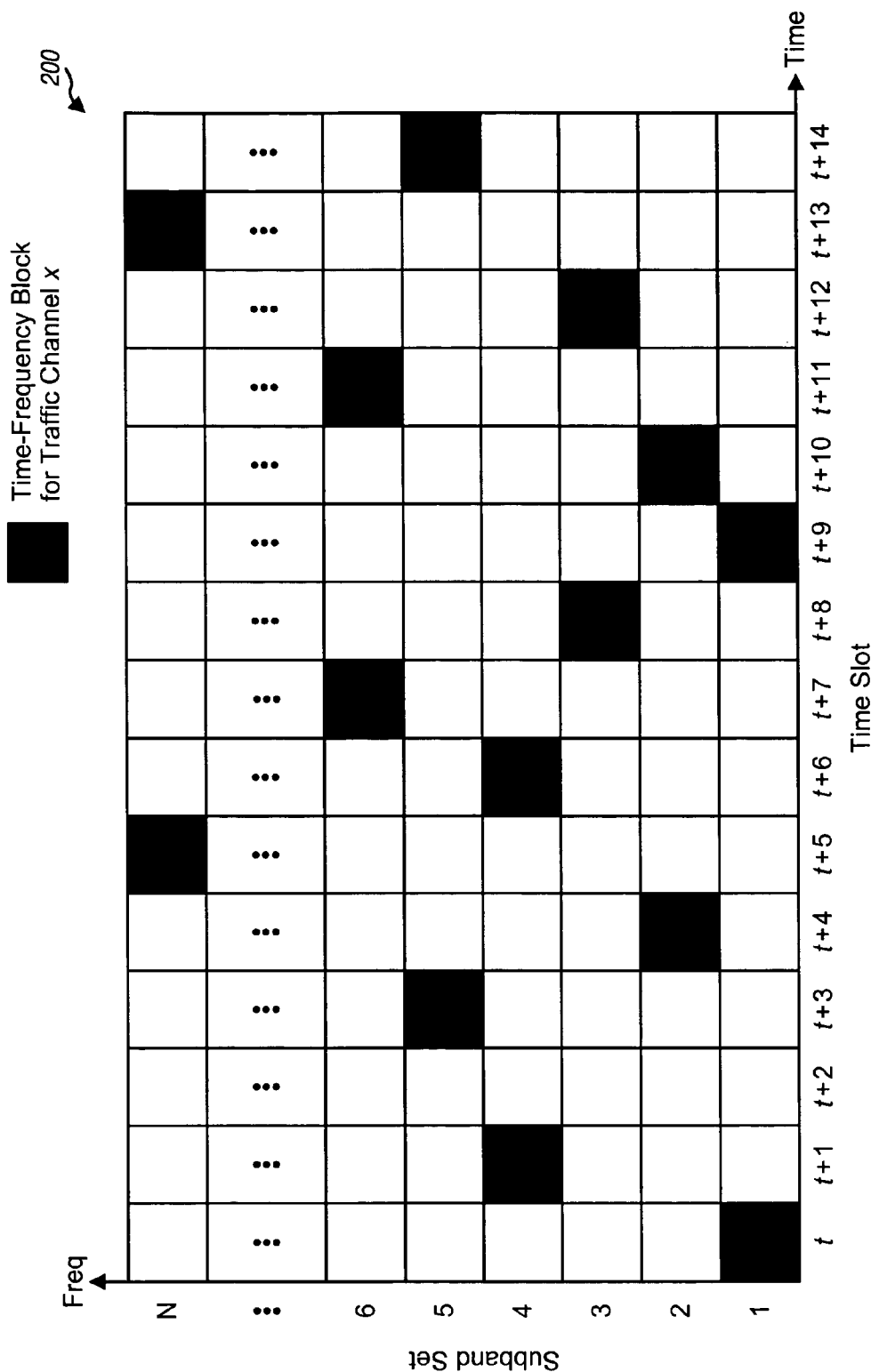
FIG. 2 shows the partitioning of system resources into time-frequency blocks according to an embodiment.

FIG. 2 shows an exemplary partitioning of the available system resources (time and frequency) into time-frequency blocks. A time-frequency block may also be called a transmission unit or by some other terminology. Each time-frequency block corresponds to a specific subband set in a specific time slot. A subband set may include one or multiple subbands, which may be contiguous or distributed across the system bandwidth. A time slot may span one or multiple symbol periods. N time-frequency blocks are available in each time slot, where N>1.

FIG. 2 also shows an exemplary mapping of a traffic channel t according to an embodiment. The traffic channel is mapped to a specific sequence of time-frequency blocks. The time-frequency blocks for the traffic channel may hop across frequency in different time slots to achieve frequency diversity, as shown in FIG. 2. The traffic channel may be associated with a frequency hopping (FH) pattern that indicates a specific time-frequency block to use for the traffic channel in each time slot usable for data transmission.

In an embodiment of quasi-orthogonal multiplexing, multiple (M) sets of traffic channels are defined, and each set contains multiple (N) traffic channels. Each traffic channel is mapped to one time-frequency block in each time slot used for data transmission. Each traffic channel is associated with a specific channel-to-resource mapping and is mapped to a specific sequence of time-frequency blocks. The N traffic channels in each set are orthogonal to one another and no two traffic channels in the set use the same time-frequency block.

The M channel sets overlap one another, and M traffic channels in the M sets map to each time-frequency block.

Random or common overlapping may be used for the M channel sets. For random overlapping, the channel-to-resource mapping for a traffic channel in a channel set is pseudo-random with respect to the channel-to-resource mappings for the traffic channels in each of the other M−1 channel sets. Random overlapping can provide intra-sector interference diversity. For common overlapping, the channel-to-resource mapping for a traffic channel in a channel set is the same as the channel-to-resource mapping for one traffic channel in each of the other M−1 channel sets. For common overlapping, M traffic channels map to and exclusively reuse the same sequence of time-frequency blocks. Common overlapping may be used for terminals that are spatially decorrelated and can be separated with receiver spatial processing techniques. Common overlapping may also be used to isolate a terminal (which may be in handoff or observing poor channel conditions) by not overlapping this terminal.

To achieve frequency hopping with random overlapping, each channel set may be associated with a different set of N frequency hopping patterns, one frequency hopping pattern for each traffic channel in the channel set. The N frequency hopping patterns for each channel set are orthogonal to one another and are pseudo-random with respect to the frequency hopping patterns for each of the other M−1 channel sets. Each traffic channel in each channel set overlaps with different sets of traffic channels in the other M−1 channel sets in different time slots.

Each channel set may also be partitioned into multiple subsets, and random or common overlapping may be used for each channel subset. For example, each channel set may be partitioned into two subsets, random overlapping may be used for one subset, and common overlapping may be used for the other subset.

Regardless of how the overlapping may be achieved, a total of M·N traffic channels are available for use in the QODA system. For simplicity, the following description assumes that each terminal that is scheduled for data transmission is assigned one traffic channel. For a given number of terminals (U) scheduled for transmission, a minimum number of channel sets (L) may be used for these terminals in order to minimize intra-sector interference, where $L=\lceil U/N \rceil \leq M$ and "$\lceil x \rceil$" denotes a ceiling operator that provides an integer value that is equal to or greater than x. Each scheduled terminal is assigned a traffic channel from among the L channel sets.

With quasi-orthogonal multiplexing, multiple terminals can use the same time-frequency block. The interference observed at each sector is composed of intra-sector interference and inter-sector interference. Intra-sector interference is interference from terminals within the same sector. Intra-sector interference can come from (1) overlapping transmissions sent by multiple terminals on the same time-frequency block and (2) loss of orthogonality among transmissions sent on orthogonal traffic channels in the same channel set. The loss of orthogonality may result in inter-carrier interference (ICI) and inter-symbol interference (ISI). Inter-sector interference (which is also called other-sector interference) is interference from terminals in other sectors. Intra-sector interference and inter-sector interference have a large impact on performance and may be mitigated using the techniques described herein.

The average number of overlapping terminals may be adjusted to achieve good system performance. The average number of overlapping terminals (Q) is also called an overlapping factor, a Q factor, a quasi-orthogonal level, and so on. A higher overlapping factor for a given sector s corresponds to a higher average number of overlapping transmissions on each time-frequency block, which may improve the overall throughput for sector s. However, the higher overlapping factor also increases interference to sector s and possibly neighbor sectors and may thus adversely impact the overall throughput achieved by each affected sector. The overlapping factor for sector s may be adjusted such that the overall throughput is maximized while meeting certain QoS requirements or objectives. The QoS requirements may be quantified by, e.g., specific minimum data rate and maximum delay requirements.

Figure 3:
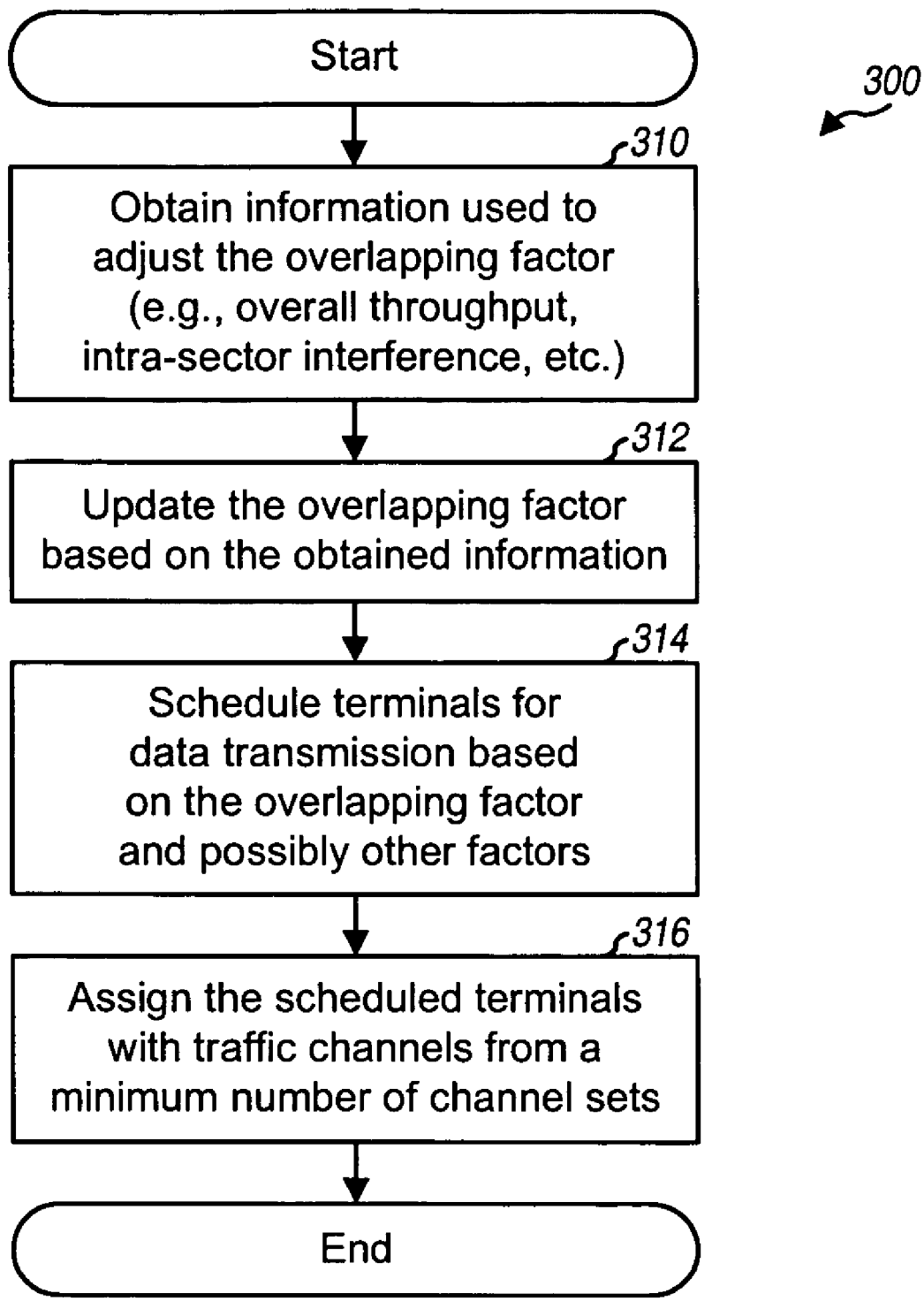
FIG. 3 shows a process for adjusting an overlapping factor for a sector according to an embodiment.

FIG. 3 shows a process 300 for adjusting the overlapping factor for a sector according to an embodiment. Initially, information used to adjust the overlapping factor is obtained (block 310). This information is dependent on the particular scheme used to adjust the overlapping factor and may be for performance metrics (e.g., overall throughput), QoS metrics (e.g., data rate and delay), intra-sector interference, and so on. The overlapping factor is updated based on the obtained information (block 312). Various schemes for adjusting the overlapping factor are described below. Terminals in the sector are scheduled for data transmission based on the overlapping factor and possibly other factors (block 314). The scheduled terminals are assigned traffic channels from a minimum number of channel sets (block 316).

The overlapping factor may be adjusted in various manners. In an embodiment, each sector maintains a separate overlapping factor and independently adjusts the overlapping factor based on information collected at that sector and possibly information from other sectors. In another embodiment, one overlapping factor is maintained for a cluster of sectors and is adjusted based on information collected from all sectors in the cluster. The cluster may be of any size and include any number of sectors. Separate overlapping factors may be maintained for the forward and reverse links, or the same overlapping factor may be used for both links. For clarity, much of the following description is for the reverse link and for the embodiment in which each sector maintains and updates its own overlapping factor.

An optimum value for the overlapping factor may be dependent on various factors such as the number of antennas deployed at the base station, the correlation between these antennas, the distribution of terminals in the sector, how well the terminals can be separated using receiver spatial processing techniques, system loading, and so on. Many of these factors are deployment specific parameters.

In an embodiment, the overlapping factor for a sector is adjusted based on one or more performance metrics such as overall throughput, average data rate, average transmission delay or latency, and so on. The sector receives transmissions from terminals in the sector as well as transmissions from terminals in neighbor sectors. The sector processes the received transmissions using receiver spatial processing techniques and separates overlapping transmissions. The sector then processes (e.g., demodulates, deinterleaves, and decodes) each transmission to obtain decoded data for the transmission. The sector may compute performance metrics (e.g., the overall throughput) based on the number of data packets transmitted by the terminals in the sector, the number of packets decoded correctly by the sector, the delay or latency experienced by the packets, and so on.

The sector may maintain a running average of the overall throughput for the sector and may periodically update this average overall throughput based on the received and decoded packets. The sector may update the overlapping factor based on the average overall throughput, as follows:

$$Q_s(l) = \begin{cases} Q_s(l-1) \cdot Q_{up}, & \text{if } OTP_s(l) > OTP_s(l-1), \\ Q_s(l-1) \cdot Q_{dn}, & \text{if } OTP_s(l) < OTP_s(l-1), \text{ and} \\ Q_s(l-1) & \text{otherwise,} \end{cases} \quad \text{Eq (1)}$$

where $OTP_s(l)$ is the average overall throughput for sectors in time interval l;

$Q_s(l)$ is the overlapping factor for sector s in time interval l;

$Q_{up}$ is the up step size for the overlapping factor, where $Q_{up}>1$; and $Q_{dn}$ is the down step size for the overlapping factor, where $Q_{dn}<1$.

The $Q_{up}$ and $Q_{dn}$ step sizes are selected to achieve the desired response for the overlapping factor. The update rate for the overlapping factor is sufficiently slow to ensure system stability. The updating of the overlapping factor may be performed at discrete time intervals, e.g., every predetermined number of time slots.

In general, a higher overlapping factor allows more terminals to use each time-frequency block (which can potentially increase throughput) but also results in higher intra-sector interference (which can cause decoding error and hence a lower throughput). For the embodiment shown in equation (1), the sector continually adjusts the overlapping factor upward until the overall throughput no longer improves.

In another embodiment, the overlapping factor is adjusted based on one or more QoS metrics such as transmission delay or latency, the average time required to successfully send packets, the average number of transmissions to successfully send packets, and so on. The overlapping factor may be increased in each time interval in which the QoS metrics exceed the QoS requirements and may be decreased if any QoS requirement is not satisfied.

In yet another embodiment, the overlapping factor is adjusted based on results of the receiver spatial processing to separate overlapping transmissions from multiple terminals. For each time-frequency block with overlapping transmissions, the received symbols at the sector may be expressed as:

$$\underline{r}(k,t,i) = \underline{H}(k,t) \cdot \underline{s}(k,t,i) + \underline{n}(k,t,i), \quad \text{Eq (2)}$$

where $\underline{s}(k,t,i)$ is an L×1 vector with L data symbols sent by L terminals on subband k in symbol period i of time slot t;

$\underline{H}(k,t)$ is a T×L channel response matrix with channel gains between the antennas at the L terminals and the T antennas at the sector;

$\underline{r}(k,t,i)$ is a T×1 vector with T received symbols obtained via the T antennas at the sector for subband k in symbol period i of time slot t; and $\underline{n}(k,t,i)$ is a T×1 vector of noise and interference observed by the sector.

For simplicity, the channel response is assumed to be constant over time slot t and is not a function of symbol period i.

The sector may separate the overlapping transmissions using a minimum mean square error (MMSE) technique, a successive interference cancellation (SIC) technique, or some other receiver processing technique. For the MMSE technique, the sector derives a spatial filter matrix as follows:

$$\underline{M}(k,t) = [\underline{H}^H(k,t) \cdot \underline{H}(k,t) + \underline{I}_{Mr}]^{-1} \cdot \underline{H}^H(k,t), \quad \text{Eq (3)}$$

where $\underline{M}(k,t)$ is an L×T MMSE spatial filter matrix for subband k in time slot t; and $\underline{I}_{Mr}$ is a covariance matrix for the noise and inter-sector interference.

The sector can estimate $\underline{H}(k,t)$ based on pilots transmitted by the terminals. For simplicity, equation (3) assumes no channel estimation error.

The sector may perform receiver spatial processing as follows:

$$\hat{\underline{s}}(k,t,i) = \underline{D}(k,t) \cdot \underline{M}(k,t) \cdot \underline{r}(k,t,i), \quad \text{Eq (4)}$$
$$= \underline{s}(k,t,i) + \underline{\tilde{n}}(k,t,i),$$

where $\underline{D}(k,t) = \text{diag}[\underline{M}(k,t) \cdot \underline{H}(k,t)]^{-1}$;

$\hat{\underline{s}}(k,t,i)$ is an L×1 vector with L detected symbols for subband k in symbol period n of time slot t; and $\underline{\tilde{n}}(k,t,i)$ is the noise and interference after the receiver spatial processing.

The overlapping factor may be adjusted based on intra-sector interference observed at the sector. Total received power includes noise, inter-sector interference, and signals from users within the same sector. The inter-sector interference may be estimated and canceled as described below, and the remaining received power may be used as a rough scaled intra-sector interference estimate. If N users occupy the same time-frequency block with received powers of $P_{rx,i}$ for i=1, ..., N, then the received signal power is equal to $\Sigma P_{rx,i}$ and the intra-sector interference would be $\sqrt{1/N \cdot \Sigma P_{rx,i}^2}$. If 2 to 3 users overlap on the same time-frequency block, then these two quantities should be roughly scaled versions of each other. The overlapping factor may be increased if the intra-sector interference is below a nominal intra-sector interference threshold and may be decreased otherwise.

The received SNR for each terminal may be expressed as:

$$\gamma_u(k,t) = \frac{\beta_u(k,t)}{1-\beta_u(k,t)}, \quad \text{Eq (5)}$$

where $\beta_u(k,t)$ is a diagonal element of $\underline{D}(k,t)^{-1}$ corresponding to terminal u; and $\gamma_u(k,t)$ is the received SNR of terminal u for subband k in time slot t.

The overlapping factor may also be adjusted based on an MMSE error. The MMSE error may be computed, e.g., as the average of the inverse of the received SNRs for the overlapping terminals, as follows:

$$MMSE_{error}(k,t) = \sum_{u=1}^{L} \frac{1}{\gamma_u(k,t)}. \quad \text{Eq (6)}$$

The overlapping factor may be increased if the MMSE error is below an MMSE error threshold and may be decreased otherwise.

In general, the overlapping factor may be adjusted based on any metric or any combination of metrics. Some exemplary metrics have been described above. Other metrics may also be used to adjust the overlapping factor, and this is within the scope of the invention.

A scheduler may schedule terminals for data transmission based on the overlapping factor and other criteria. In each scheduling interval, which may span one or multiple time slots, the scheduler selects a particular number of terminals for data transmission based on the overlapping factor. For example, the scheduler may select roughly N·Q terminals for transmission in each scheduling interval. The scheduler then assigns traffic channels to the selected terminals based on various criteria such as spatial compatibility, received SNRs, QoS requirements, handoff status, and so on. For example, the scheduler may assign common overlapping traffic channels to spatially compatible terminals that can be separated using receiver spatial processing techniques. Common overlapping traffic channels are traffic channels that mapped to the same time-frequency blocks in the scheduling interval. The scheduler may also assign traffic channels to terminals based on their received SNRs. For example, better performance may be achieved by overlapping a low SNR terminal with a high SNR terminal. The scheduler may also assign terminals having a low QoS metric with (1) common overlapping traffic channels with no other terminals sharing these traffic channels or (2) random overlapping traffic channels that share time-frequency blocks with low SNR terminals. Random overlapping traffic channels are traffic channels that mapped to different time-frequency blocks in the scheduling interval.

The overlapping factor determines the number of terminals that can use each time-frequency block on average, which affects the intra-sector interference observed by the serving sector and the inter-sector interference observed by neighbor sectors. For overlapping terminals, the transmit powers required to achieve a particular received SNR or a particular data rate are dependent on the overlapping factor. Power control may thus be performed in a manner to account for the overlapping factor.

The transmit power for the data transmission sent by each terminal may be controlled in a manner to mitigate both intra-sector interference and inter-sector interference. The transmit power is adjusted such that the amount of intra-sector interference that the terminal might cause to the serving sector and the amount of inter-sector interference that the terminal might cause to neighboring sectors are both maintained within acceptable levels.

Power control for the traffic channels may be performed in various manners. For clarity, a specific embodiment of power control is described below. For this embodiment, the transmit power for a traffic channel used by a terminal may be expressed as:

$$P_{dch}(n) = P_{ref}(n) + \Delta P(n), \qquad \text{Eq (7)}$$

where $P_{dch}(n)$ is the transmit power for the traffic channel for update interval n;

$P_{ref}(n)$ is a reference power level for update interval n; and $\Delta P(n)$ is a transmit power delta for update interval n.

The power levels $P_{dch}(n)$ and $P_{ref}(n)$ and the transmit power delta $\Delta P(n)$ are given in units of decibels (dB).

The reference power level $P_{ref}(n)$ is the amount of transmit power needed to achieve a target SNR for a designated transmission, which may be signaling sent on a control channel. The reference power level and the target SNR may be adjusted to achieve a desired level of performance (e.g., 1% packet error rate (PER)) for the designated transmission. If the reference power level can achieve the target SNR, then the received SNR for the traffic channel may be estimated as:

$$SNR_{dch}(n) = SNR_{target} + \Delta P(n). \qquad \text{Eq (8)}$$

Equation (8) assumes that the data transmission on the traffic channel and the designated transmission observe similar noise and interference characteristics. $SNR_{dch}(n)$ may also be determined in other manners, e.g., if the control channel and the traffic channel experience different noise and interference characteristics.

The transmit power delta $\Delta P(n)$ may be adjusted in a manner to achieve the desired SNR for the traffic channel, maintain intra-sector interference within an acceptable level, and reduce inter-sector interference. These objectives may be achieved, for example, by requiring the transmit power delta for the terminal to be within a predetermined range, as follows:

$$\Delta P(n) \in [\Delta P_{min}, \Delta P_{max}], \qquad \text{Eq (9)}$$

where $\Delta P_{min}$ is the minimum transmit power delta allowable for the traffic channel, and $\Delta P_{max}$ is the maximum transmit power delta allowable for the traffic channel.

The constraint in equation (9) effectively limits the received SNRs for the traffic channels for all terminals to be within a range of $[SNR_{min}, SNR_{max}]$. This constraint limits the amount of the variability in the received SNRs for the terminals and ensures that the amount of intra-sector interference caused by each terminal is within an acceptable level. In general, a terminal located close to a neighbor sector that reports high interference may transmit with a lower transmit power delta so that its received SNR is closer to $SNR_{min}$. Conversely, a terminal located close to the serving sector may transmit with a higher transmit power delta so that its received SNR is closer to $SNR_{max}$. A range of received SNRs is typically observed for the terminals in the system based on their proximity to the serving sectors. The scheduler in each sector can take advantage of the distribution of received SNRs to achieve high throughput while ensuring fairness for the terminals.

In an embodiment, a QoS power control parameter is used to ensure that all terminals can meet QoS requirements. The $\Delta P_{min}$ in equation (9) may be used as this QoS power control parameter and may be adjusted in a manner to achieve the desired QoS level for all terminals. $\Delta P_{min}$ applies mostly to sector-edge terminals located at the edge of coverage and observing poor channel conditions. A sector-edge terminal has a small channel gain (or a large path loss) for the serving sector and needs to transmit at a high power level in order to achieve the target SNR at the serving sector. The sector-edge terminal is also typically located closer to a neighbor sector, and the high transmit power level results in high inter-sector interference to this neighbor sector. A smaller $\Delta P_{min}$ allows the sector-edge terminal to transmit at a lower power level, which then reduces the inter-cell interference. However, $\Delta P_{min}$ should not be set too low in order to ensure that the sector-edge terminal can achieve a specific minimum SNR, and hence a specific minimum data rate, for data transmission.

In an embodiment, a power control mechanism comprised of four loops is used to adjust the transmit power of a terminal. A reference loop estimates the received SNR of the terminal and adjusts the reference power level $P_{ref}(n)$ such that the received SNR is maintained at or near the target SNR. A $\Delta P$ loop adjusts the transmit power for the terminal based on inter-sector interference consideration. A QoS loop adjusts $\Delta P_{min}$ to ensure that the desired QoS level is achieved for the terminal. A Q loop adjusts the overlapping factor to achieve good performance for the sector. The reference loop, $\Delta P$ loop, QoS loop, and Q loop may be updated at different rates to ensure stability. For example, the Q loop may be updated at a slower rate than the QoS loop, which may be updated at a slower rate than the ΔP loop, which may be updated at a slower rate than the reference loop.

The power control mechanism effectively uses different mechanisms to separately control inter-sector interference and intra-sector interference. The sector-edge terminals are the predominant sources of inter-sector interference. The QoS loop adjusts $\Delta P_{min}$, which mainly affects the sector-edge terminals, and hence controls the amount of inter-sector interference caused by these sector-edge terminals. The overlapping terminals are the major sources of intra-sector interference. The Q loop adjusts the overlapping factor and hence controls the amount of intra-sector interference observed by the overlapping terminals. For clarity, an exemplary design for the four loops is described below.

Figure 4:
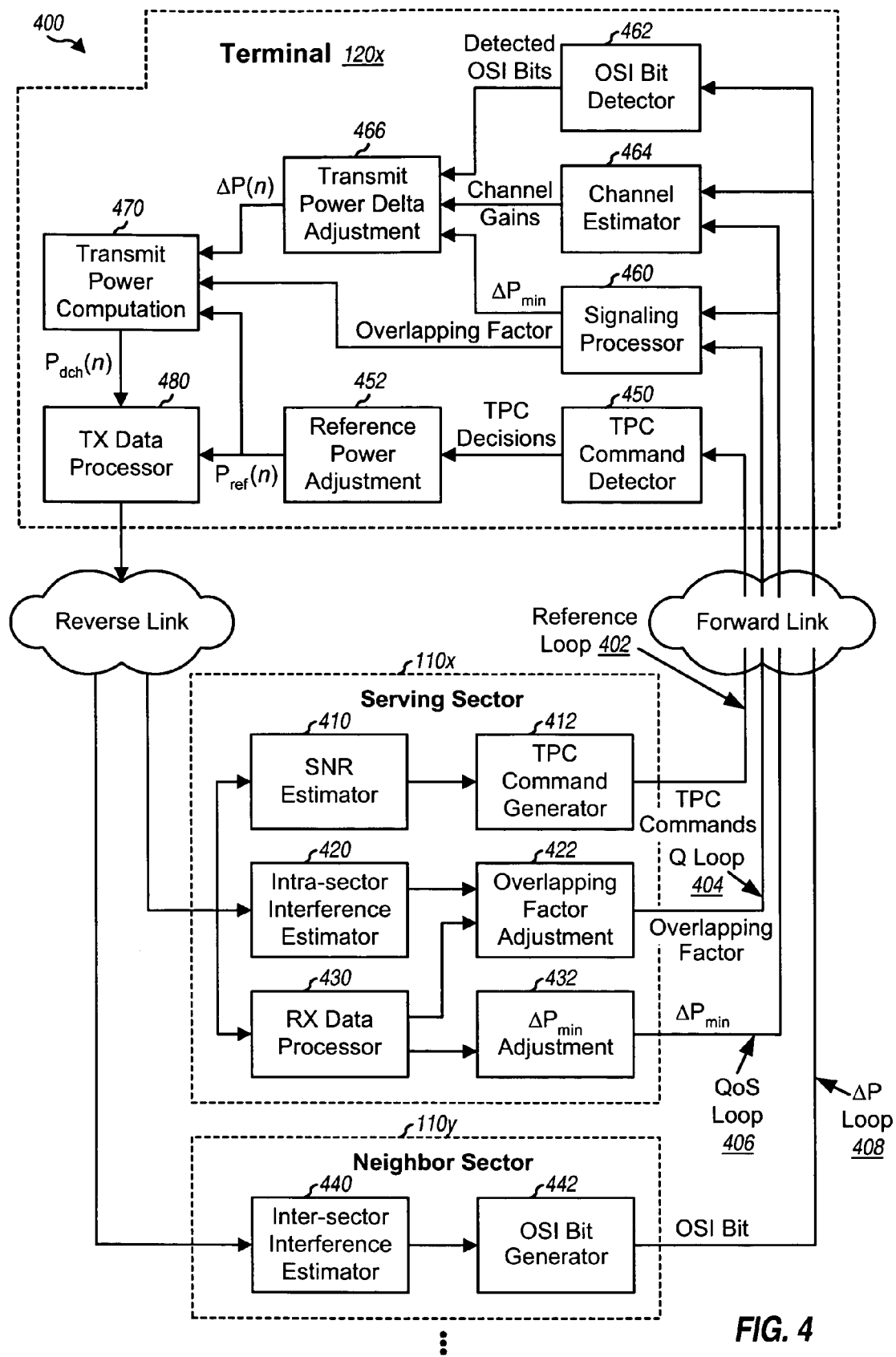
FIG. 4 shows a power control mechanism with four loops according to an embodiment.

FIG. 4 shows a power control mechanism 400 that may be used to adjust the transmit power of a terminal 120x according to an embodiment. Terminal 120x communicates with a serving sector 110x and may cause interference to neighbor sectors. FIG. 4 shows only one neighbor sector 110y for simplicity. Power control mechanism 400 includes a reference loop 402, a Q loop 404, a QoS loop 406, and a ΔP loop 408. Reference loop 402, Q loop 404, and QoS loop 406 operate between terminal 120x and serving sector 110x. ΔP loop 408 operates between terminal 120x and neighbor sector 110y.

Reference loop 402 adjusts the transmit power for the designated transmission and maintains the received SNR for this designated transmission, as measured at serving sector 110x, as close as possible to the target SNR. For reference loop 402, an SNR estimator 410 within serving sector 110x estimates the received SNR for the designated transmission. A TPC command generator 412 compares the received SNR against the target SNR and generates TPC commands based on the comparison results. Each TPC command may be (1) an UP command to direct terminal 120x to increase the reference power level $P_{ref}(n)$ if the received SNR is below the target SNR or (2) a DOWN command to direct the terminal to decrease the reference power level if the received SNR is equal to or higher than the target SNR. Serving sector 110x transmits the TPC commands on the forward link to terminal 120x.

Terminal 120x receives and processes the forward link transmission from serving sector 110x. A TPC command detector 450 detects each received TPC command and provides a TPC decision, which may be either (1) an UP decision if the received TPC command is deemed to be an UP command or (2) a DOWN decision if the received TPC command is deemed to be a DOWN command. A reference power adjustment unit 452 adjusts the reference power level $P_{ref}(n)$ based on the TPC decisions from TPC detector 450, as described below. A TX data processor 480 sets the transmit power for the designated transmission to the $P_{ref}(n)$ level indicated by unit 452. The designated transmission is sent to serving sector 10x.

Due to path loss, fading, and multipath effects on the reverse link, which typically vary over time and especially for a mobile terminal, the received SNR for the designated transmission continually fluctuates. Reference loop 402 attempts to maintain the received SNR at or near the target SNR in the presence of changes in the channel conditions on the reverse link.

ΔP loop 408 adjusts the transmit power for the traffic channel such that a power level that is as high as possible is used for the traffic channel while keeping inter-sector interference to within acceptable levels. For ΔP loop 408, an inter-sector interference estimator 440 within neighbor sector 110y receives transmissions on the reverse link and estimates the inter-sector interference observed by sector 110y from terminals in other sectors. An OSI bit generator 442 receives the inter-sector interference estimate from estimator 440 and sets the OSI bit for neighbor sector 110y, as described below. Neighbor sector 110y broadcasts the OSI bit on the forward link to terminals in the system.

Q loop 404 and QoS loop 406 each directly or indirectly adjust the transmit power for the traffic channel assigned to terminal 120x such that the good performance is achieved for the terminal. For Q loop 404, a receive (RX) data processor 430 within serving sector 110x processes the data transmissions from terminals in sector 110x, determines whether each packet is decoded correctly or in error, and determines one or more performance metrics (e.g., overall throughput) and/or one or more QoS metrics for sector 110x. An intra-sector interference estimator 420 estimates the intra-sector interference observed by serving sector 110x. An overlapping factor adjustment unit 422 receives the performance and/or QoS metrics from processor 430 and possibly the intra-sector interference estimate from estimator 420 and adjusts the overlapping factor for serving sector 110x. For QoS loop 406, a $\Delta P_{min}$ adjustment unit 432 receives QoS metrics from processor 430 and adjusts $\Delta P_{min}$ to meet QoS requirements. Serving sector 110x broadcasts the overlapping factor and $\Delta P_{min}$ on the forward link to terminals within the sector.

At terminal 120x, a signaling processor 460 processes the forward link transmission from serving sector 110x and provides the overlapping factor and $\Delta P_{min}$ sent by sector 110x. An OSI bit detector 462 receives and processes the OSI bits broadcast by neighbor sectors and provides the detected OSI bits. A channel estimator 464 receives pilots from the serving and neighbor sectors, estimates the channel gain for each sector, and provides the estimated channel gains for all sectors. A transmit power delta adjustment unit 466 adjusts the transmit power delta ΔP(n) for the traffic channel based on the detected OSI bit, the channel gains, and $\Delta P_{min}$, as described below. A transmit power computation unit 470 receives the reference power level $P_{ref}(n)$, the transmit power delta ΔP(n), and the overlapping factor. Unit 470 computes the transmit power $P_{dch}(n)$ for the traffic channel based on all of the inputs. TX data processor 480 uses the transmit power $P_{dch}(n)$ for data transmission to serving sector 110x.

Figure 5:
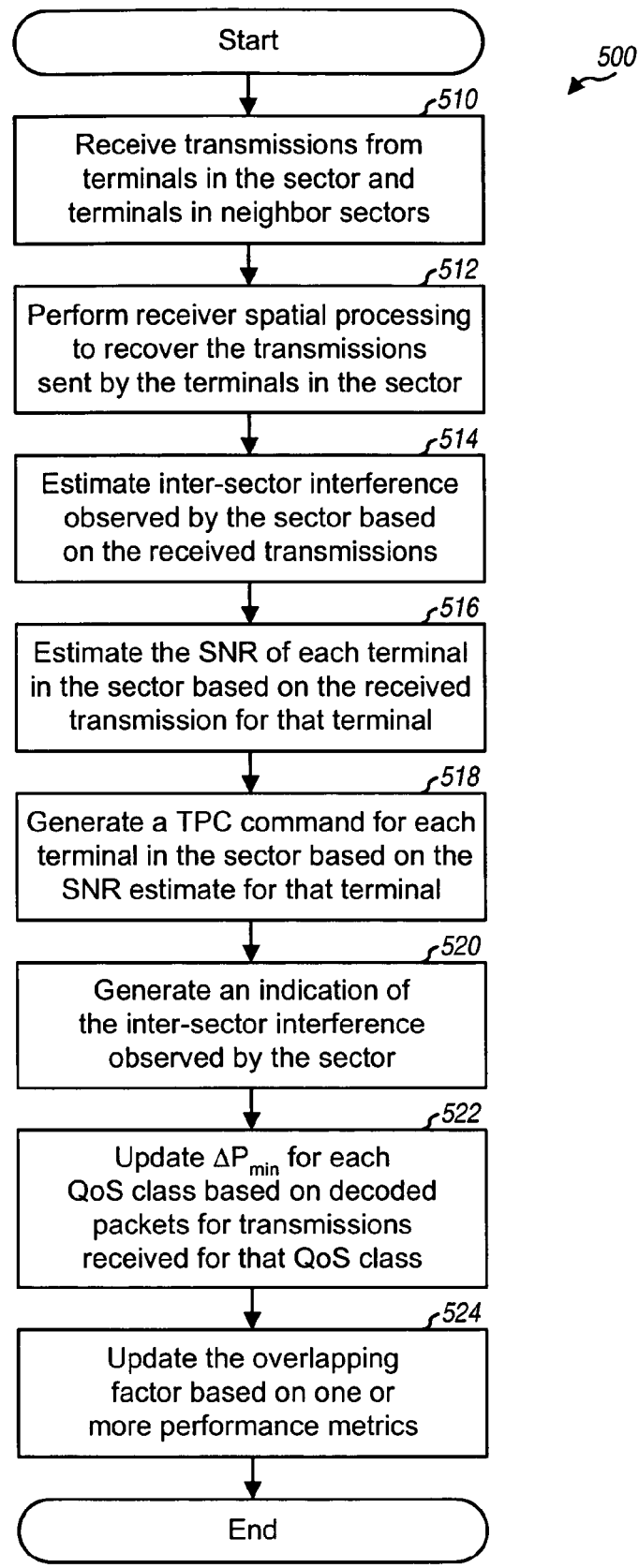
FIG. 5 shows a process performed by a sector to support power control according to an embodiment.

FIG. 5 shows a process 500 performed by a sector to support power control for terminals in that sector and terminals in neighbor sectors according to an embodiment. Transmissions from the terminals in the sector as well as transmissions from the terminals in neighbor sectors are received (block 510) and spatially processed to recover the transmissions sent by the terminals in the sector (block 512). Inter-sector interference and possibly intra-sector interference observed by the sector are estimated based on the received transmissions (block 514). The inter-sector interference may be estimated, e.g., as follows:

$$\|\underline{n}(k,t,i)\|^2 = \|\underline{r}(k,t,i) - \underline{H}(k,t) \cdot \underline{s}_p(k,t,i)\|^2, \qquad \text{Eq (10)}$$

where $\underline{s}_p(k,t,i)$ is an L×1 vector with L pilot symbols sent by L terminals on subband k in symbol period i of time slot t; and $\|\underline{n}(k,t,i)\|^2$ is an inter-sector interference measurement for subband k in symbol period i of time slot t.

Alternatively, an interference-over-thermal ratio (IOT), which is a ratio of the interference power observed by the sector to the thermal noise power, is estimated. The following description assumes that inter-sector interference (instead of IOT) is estimated. The inter-sector interference measurements for multiple subbands and/or multiple symbol periods may be averaged using arithmetic averaging, geometric averaging, SNR-based averaging, and so on to obtain an inter-sector interference estimate, $I_{inter,s}$, for the sector. Intra-sector interference measurements may also be averaged to obtain an intra-sector interference estimate, $I_{intra,s}$.

The received SNR of each terminal in the sector is estimated based on the received transmission for that terminal, e.g., as shown in equation (5) (block 516). A TPC command is generated for each terminal in the sector based on the SNR estimate for that terminal (block 518).

An indication of the inter-sector interference observed by the sector is generated (block 520). This indication may be given in various formats. In one embodiment, the inter-sector interference estimate is quantized to a predetermined number of bits. In another embodiment, a single bit is used to indicate whether the inter-sector interference is greater than or below a nominal inter-sector interference threshold. In yet another embodiment, one bit is used to indicate whether the inter-sector interference exceeds the nominal threshold and another distress/panic bit is used to indicate whether the inter-sector interference exceeds a high threshold. For simplicity, the following description assumes the use of a single OSI bit to provide inter-sector interference information. The sector may set this OSI bit as follows:

$$OSIB_s(m) = \begin{cases} \text{'1'}, & \text{if } I_{inter,s}(m) \geq I_{target}, \text{ and} \\ \text{'0'}, & \text{if } I_{inter,s}(m) < I_{target}, \end{cases} \quad \text{Eq (11)}$$

where $I_{inter,s}(m)$ is the inter-sector interference estimate for sectors in time interval m;

$I_{target}$ is the nominal inter-sector interference threshold; and $OSIB_s(m)$ is the OSI bit for sectors in time interval m.

The OSI bit is set at a rate selected to provide good performance.

The system may support multiple QoS classes, e.g., for voice, packet data, video, text messages, signaling, and so on. Each QoS class may have certain minimum performance requirements and may be associated with a certain $\Delta P_{min}$ needed to meet the requirements. The $\Delta P_{min}$ for each QoS class may be updated based on decoded packets for transmissions received for that QoS class (block 522). For example, $\Delta P_{min}$ for a voice QoS class may be adjusted to achieve a target PER of 1% or better for all voice transmissions.

The overlapping factor is updated based on one or more performance metrics, e.g., as shown in equation (1) (block 524). The overlapping factor may be used for scheduling terminals and assigning traffic channels and for power control.

The sector broadcasts the OSI bit to allow terminals in neighbor sectors to adjust their transmit powers based on the inter-sector interference observed at this sector. The sector also broadcasts the $\Delta P_{min}$ for all QoS classes to allow the terminals in the sector to adjust their transmit powers in order to meet the QoS requirements. The sector may or may not broadcast the overlapping factor to the terminals within the sector. Different power control behaviors may be achieved depending on whether or not the overlapping factor is broadcast, as described below.

Figure 6:
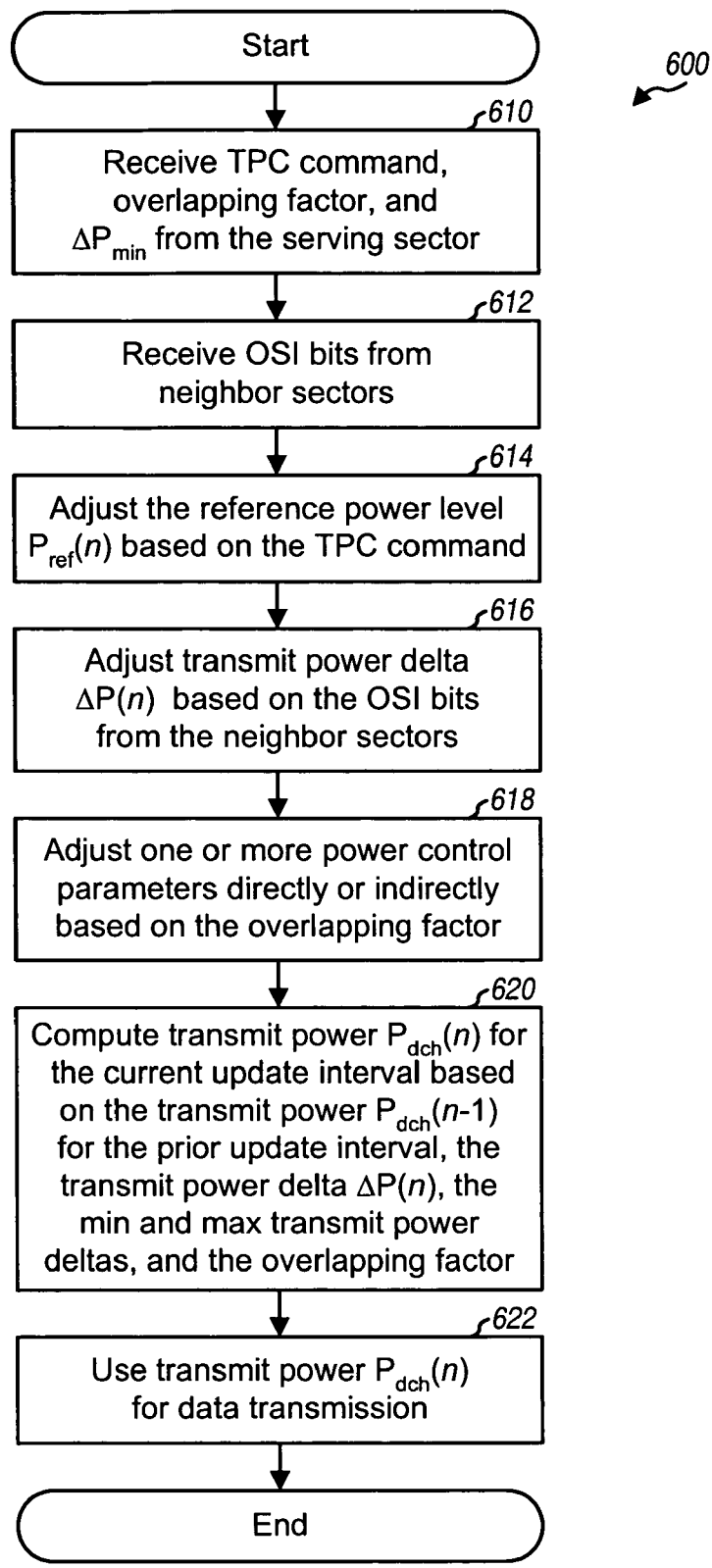
FIG. 6 shows a process performed by a terminal for power control according to an embodiment.

FIG. 6 shows a process 600 performed by a terminal for power control for an embodiment in which each sector broadcasts the overlapping factor. A TPC command is received from the serving sector in each update interval and the overlapping factor and $\Delta P_{min}$ are received from the serving sector at a slower rate (block 610). OSI bits are received from the neighbor sectors (block 612). The channel gains for the serving and neighbor sectors may be estimated, e.g., based on pilots transmitted by these sectors.

The reference power level $P_{ref}(n)$ is adjusted based on the TPC command received from the serving sector (block 614), as follows:

$$P_{ref}(n) = \begin{cases} P_{ref}(n-1) + P_{up}, & \text{if } TPC = UP, \text{ and} \\ P_{ref}(n-1) + P_{dn}, & \text{if } TPC = DOWN, \end{cases} \quad \text{Eq (12)}$$

where $P_{up}$ is an up step size for the reference power level and $P_{dn}$ is a down step size for the reference power level.

In general, the transmit power used by the terminal for data transmission may be increased if low interference is observed by neighbor sectors and decreased if high interference is observed. The transmit power may also be adjusted by a larger amount and/or more frequently if (1) the terminal is located closer to a neighbor sector observing high interference and/or (2) the current transmit power level is high. The transmit power may be adjusted by a smaller amount and/or less frequently if (1) the terminal is located closer to the serving sector and/or (2) the current transmit power level is low. For the embodiment shown in equation (7), the transmit power for the terminal is related to and controlled by the transmit power delta.

The transmit power delta $\Delta P(n)$ is adjusted based on the OSI bits received from the neighbor sectors and possibly other factors (block 616). In an embodiment, $\Delta P(n)$ is adjusted based on the OSI bit from the strongest neighbor sector and a channel gain ratio $r_{sns}(n)$ for this neighbor sector, which is the ratio of the channel gain $g_{ss}(n)$ for the serving sector over the channel gain $g_{sns}(n)$ for the neighbor sector, or $r_{sns}(n)=g_{ss}(n)/g_{sns}(n)$. For example, $\Delta P(n)$ may be adjusted in a deterministic manner, as follows:

$$\Delta P(n) = \begin{cases} \Delta P(n-1) + \Delta P_{up}(n), & \text{if } OSI \text{ bit} = \text{'0'}, \text{ and} \\ \Delta P(n-1) + \Delta P_{dn}(n), & \text{if } OSI \text{ bit} = \text{'1'}, \end{cases} \quad \text{Eq (13)}$$

where $\Delta P_{up}(n)$ and $\Delta P_{dn}(n)$ may be fixed values or may be functions of the channel gain ratio $r_{sns}(n)$ for the strongest neighbor sector, the transmit power delta $\Delta P(n-1)$ for the prior update interval n-1, and so on. If the strongest neighbor sector observes high inter-sector interference and sets its OSI bit to '1', then $\Delta P_{dn}(n)$ may be related to both the channel gain ratio $r_{sns}(n)$ and the transmit power delta $\Delta P(n-1)$ so that (1) a larger channel gain for the strongest neighbor sector results in a larger $\Delta P_{dn}(n)$ and (2) a larger value of $\Delta P(n-1)$ results in a larger $\Delta P_{dn}(n)$. Conversely, if the strongest neighbor sector observes low inter-sector interference and sets its OSI bit to '0', then $\Delta P_{up}(n)$ may be inversely related to both the channel gain ratio $r_{sns}(n)$ and the transmit power delta $\Delta P(n-1)$ so that (1) a larger channel gain for the strongest neighbor sector results in a smaller $\Delta P_{up}(n)$ and (2) a larger of $\Delta P(n-1)$ results in a smaller $\Delta P_{up}(n)$.

$\Delta P(n)$ may also be adjusted in a probabilistic manner. For example, if the OSI bit is set to '0', then a probability $Pr_{up}(n)$ for increasing $\Delta P(n)$ is determined, and $\Delta P(n)$ is increased by $\Delta P_{up}$ based on this probability. Conversely, if the OSI bit is set to '1', then a probability $Pr_{dn}(n)$ for decreasing $\Delta P(n)$ is determined, and $\Delta P(n)$ is decreased by $\Delta P_{dn}$ based on this probability. $Pr_{up}(n)$ and $Pr_{dn}(n)$ may be determined based on $\Delta P(n)$ and $r_{sns}(n)$, and $\Delta P_{up}$ and $\Delta P_{dn}$ may be fixed values. The transmit power delta may also be updated in other manners.

The terminal may respond to only the OSI bit of the strongest neighbor sector, as described above. The terminal may also adjust its transmit power based on OSI bits of multiple neighbor sectors. For example, the terminal may adjust the transmit power delta for multiple strongest neighbor sectors, one sector at a time. The channel gain ratio for each neighbor sector may be taken into account in the variable step sizes $\Delta P_{up}(n)$ and $\Delta P_{dn}(n)$ or the adjustment probabilities $\Pr_{up}(n)$ and $\Pr_{dn}(n)$.

One or more power control parameters may be directly or indirectly adjusted based on the overlapping factor for the serving sector (block 618). For example, $P_{dch}(n)$, $\Delta P_{min}$, $\Delta P_{max}$, and/or some other parameter may be adjusted based on the overlapping factor. The transmit power $P_{dch}(n)$ for the current update interval n is then computed based on the reference power level $P_{ref}(n)$, the transmit power delta $\Delta P(n)$, the minimum and maximum transmit power deltas $\Delta P_{min}$ and $\Delta P_{max}$, the overlapping factor, and possibly other factor (block 620). For example, $\Delta P(n)$ may be constrained to be within the range of $\Delta P_{min}$ and $\Delta P_{max}$, as shown in equation (9). The transmit power may then be computed as follows:

$$P_{dch}(n) = P_{ref}(n) + \Delta P(n) - Q_{dB}(n), \qquad \text{Eq (14)}$$

where $Q_{db}(n)$ is the overlapping factor that is applicable in update interval n and is given in units of dB. $P_{dch}(n)$ may further be constrained to be equal to or less than a predetermined maximum power level, or $P_{dch}(n) \leq P_{max}$. The final $P_{dch}(n)$ is then used for data transmission in the current update interval (block 622).

In another embodiment, each sector updates the overlapping factor but does not broadcast the overlapping factor. For this embodiment, the Q loop is implicit. When the overlapping factor changes, the minimum transmit powers required by the sector-edge terminals to achieve a specified data rate also change because of the change in intra-sector interference. The QoS loop then adjusts $\Delta P_{min}$ so that the sector-edge terminals can achieve the specified data rate. The transmit power delta $\Delta P(n)$ for each terminal in each sector then converges to the proper value based on the OSI bits transmitted by neighbor sectors. For this embodiment, $\Delta P_{min}$ is indirectly updated by the overlapping factor. The transmit power is affected by $\Delta P_{min}$ and is thus indirectly adjusted by the overlapping factor.

FIGS. 4 through 6 show a specific power control mechanism and a specific embodiment for performing power control in the QODA system. Power control may also be performed in other manners and/or with different parameters than those described above. For example, the TPC commands may be used to adjust the transmit power for the traffic channel directly instead of via a reference power level. The indication of inter-sector interference may also be used to adjust the transmit power for the traffic channel directly instead of via the transmit power delta. The performance metrics, QoS metrics, and overlapping factor may also be accounted for in other manners than the manner described above.

Figure 7:
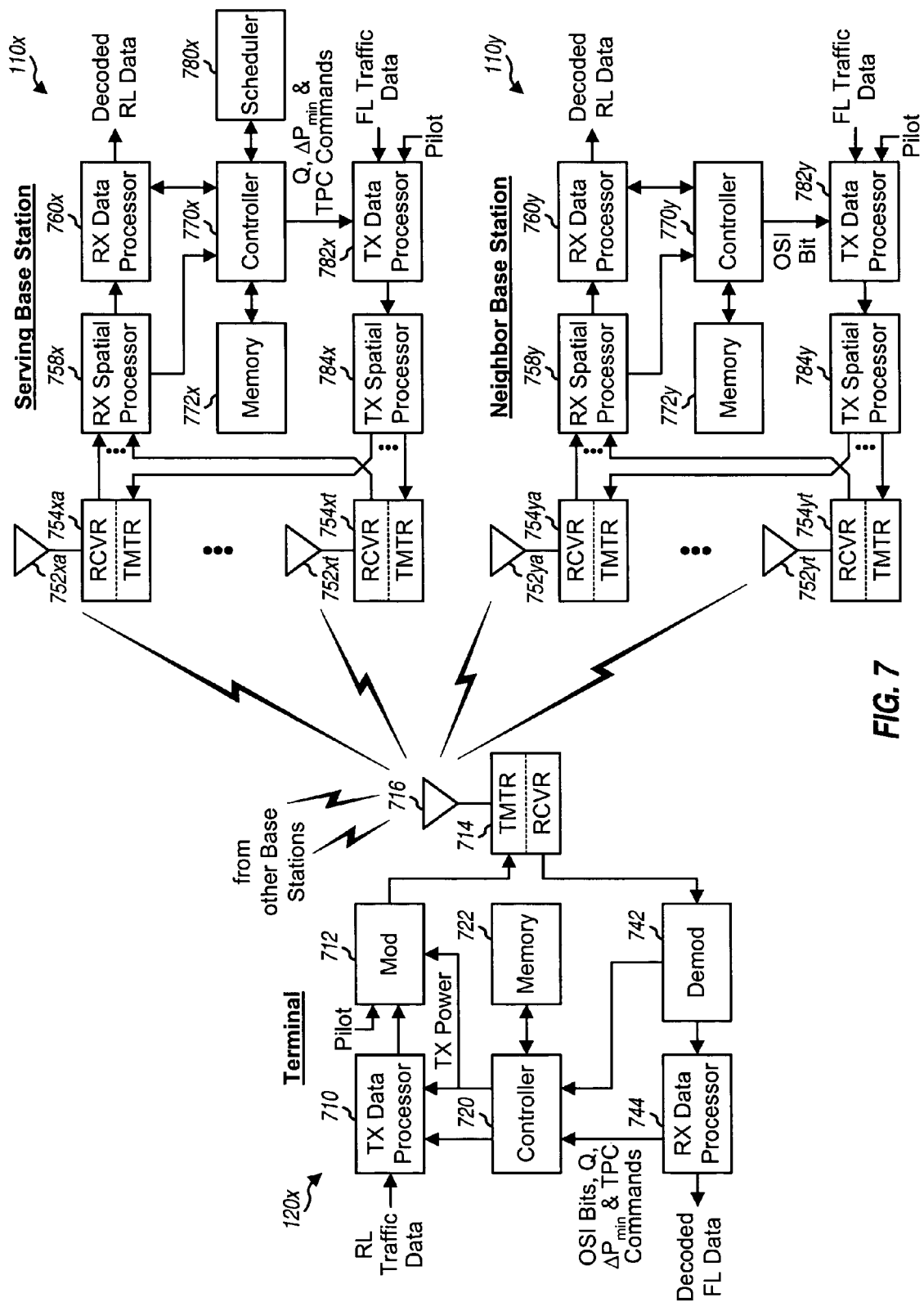
FIG. 7 shows a block diagram of a terminal and two base stations according to an embodiment.

FIG. 7 shows a block diagram of an embodiment of terminal 120x, serving base station 110x, and neighbor base station 110y. On the reverse link, at terminal 120x, a TX data processor 710 encodes, interleaves, and symbol maps reverse link (RL) traffic data and control data and provides data symbols for the traffic and control data. A modulator (Mod) 712 receives and maps the data symbols and pilot symbols onto the proper subbands and symbol periods, performs OFDM modulation, and provides a sequence of complex-valued chips. A transmitter unit (TMTR) 714 conditions (e.g., converts to analog, amplifies, filters, and frequency upconverts) the sequence of chips and generates a reverse link signal, which is transmitted via an antenna 716.

At serving base station 110x, multiple antennas 752xa through 752xt receive the reverse link signals from terminal 120x and other terminals, and each antenna 752x provides a received signal to a respective receiver unit (RCVR) 754x. Each receiver unit 754x conditions (e.g., filters, amplifies, and frequency downconverts) its received signal, digitizes the conditioned signal, performs OFDM demodulation, and provides received symbols. An RX spatial processor 758 obtains received symbols from all receiver units 754xa through 754xt, performs receiver spatial processing (e.g., spatial matched filtering) to separate overlapping transmissions, and provides detected symbols, which are estimates of the transmitted data symbols. An RX data processor 760x deinterleaves and decodes the detected symbols, provides decoded data for terminal 120x as well as other terminals being served by base station 110x, and also provides information (e.g., packet status, timing information) used to derive performance and QoS metrics for adjusting the overlapping factor and QoS power control parameter.

The processing for a forward link transmission may be performed similarly to that described above for the reverse link. The processing for the transmissions on the forward and reverse links is typically specified by the system.

For power control, at serving base station 110x, RX spatial processor 758x estimates the received SNR for terminal 120x and provides an SNR estimate to controller 770x. Controller 770x generates TPC commands for terminal 120x based on the SNR estimate for the terminal and the target SNR. Controller 770x also receives packet status from RX data processor 760x, derives performance metrics and/or QoS metrics, updates the overlapping factor (e.g., based on a performance metric such as overall throughput), and updates the QoS power control parameter (e.g., updates $\Delta P_{min}$ based on the QoS metrics). The TPC commands, overlapping factor (Q), and $\Delta P_{min}$ are processed by a TX data processor 782x and a TX spatial processor 784x, conditioned by transmitter units 754xa through 754xt, and transmitted via antennas 752xa through 752xt to terminal 120x. At neighbor base station 110y, an RX spatial processor 758y estimates the inter-sector interference observed by base station 110y and provides an interference estimate to controller 770y. Controller 770y generates the OSI bit for base station 110y based on the interference estimate and the nominal interference threshold. The OSI bit is processed and broadcast to terminals in the system. Controller 770y may also generate some other type of indication for the inter-sector interference observed by base station 110y.

At terminal 120x, antenna 716 receives the forward link signals from the serving and neighbor base stations and provides a received signal to receiver unit 714. The received signal is conditioned and digitized by receiver unit 714 and further processed by a demodulator (Demod) 742 and an RX data processor 744 to obtain received TPC commands, OSI bits, overlapping factor, and $\Delta P_{min}$. A channel estimator within demodulator 742 estimates the channel gain for each base station. Controller 720 detects the received TPC commands and updates the reference power level based on the TPC decisions. Controller 720 also adjusts the transmit power for the traffic channel based on the received OSI bits for the neighbor base stations, the channel gains for the serving and neighbor base stations, the overlapping factor, and $\Delta P_{min}$ as described above. Controller 720 provides the transmit power for the traffic channel used by terminal 120x. Processor 710 and/or modulator 712 scales the data symbols for the traffic channel based on the transmit power from controller 720.

Controllers 720, 770x, and 770y direct the operations of various processing units at terminal 120x and base station 110x and 110y, respectively. These controllers may also perform various functions for data transmission and power control. For example, controller 720 may implement any or all of units 450 through 470 shown in FIG. 4. Controller 720 may also implement parts of process 600 in FIG. 6. Controller 770 for each base station 110 may implement any or all of units 410 through 442 in FIG. 4. Controller 770 may also implement parts of process 500 in FIG. 5. Memory units 722, 772x, and 772y store data and program codes for controllers 720, 770x, and 770y, respectively. A scheduler 780x schedules terminals for data transmission based on the overlapping factor and also assigns traffic channels to the scheduled terminals.

The data transmission and power control techniques described herein may be implemented by various means. For example, these techniques may be implemented in hardware, software, or a combination thereof. For a hardware implementation, the processing units used to update the overlapping factor, schedule terminals, and support power control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 722, 772x, or 772y in FIG. 7) and executed by a processor (e.g., controller 720, 770x, or 770y). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    a processor operative to provide information used to adjust an overlapping factor indicative of an average number of overlapping transmissions; and
    a controller operative to update the overlapping factor based on the information from the processor.

2. The apparatus of claim 1, wherein the controller is operative to determine at least one performance metric and to update the overlapping factor based on the at least one performance metric.

3. The apparatus of claim 1, wherein the processor is operative to provide status of received packets, and wherein the controller is operative to determine an overall throughput based on the status of the received packets from the processor and to update the overlapping factor based on the overall throughput.

4. The apparatus of claim 1, wherein the controller is operative to determine at least one quality of service (QoS) metric and to update the overlapping factor based on the at least one QoS metric.

5. The apparatus of claim 1, wherein the processor is operative to perform receiver spatial processing to separate overlapping transmissions and to provide results of the receiver spatial processing, and wherein the controller is operative to adjust the overlapping factor based on the results of the receiver spatial processing.

6. The apparatus of claim 1, wherein the processor is operative to estimate interference observed b and to provide an interference estimate, and wherein the controller is operative to adjust the overlapping factor based on the interference estimate.

7. The apparatus of claim 1, further comprising:
    a scheduler operative to schedule terminals for data transmission based on the overlapping factor.

8. The apparatus of claim 7, wherein the scheduler is operative to assign the scheduled terminals to a plurality of channel sets each consisting of traffic channels, and wherein traffic channels in each channel set are orthogonal to one another and are pseudo-random with respect to traffic channels in each remaining channel set.

9. The apparatus of claim 7, wherein the scheduler is operative to assign the scheduled terminals with traffic channels in a minimum number of channel sets.

10. The apparatus of claim 1, wherein the processor is operative to provide information for each of a plurality of frequency subbands, and wherein the controller is operative to maintain and update an overlapping factor for each frequency subband based on the information for the frequency subband.

11. The apparatus of claim 10, wherein the plurality of frequency subbands are formed with orthogonal frequency division multiplexing (OFDM).

12. A method of controlling data transmission, comprising:
    obtaining information used to adjust an overlapping factor indicative of an average number of overlapping transmissions; and
    updating the overlapping factor based on the obtained information.

13. The method of claim 12, further comprising:
    determining at least one performance metric based on the obtained information, and wherein the updating the overlapping factor comprises updating the overlapping factor based on the at least one performance metric.

14. The method of claim 12, further comprising:
    scheduling terminals for data transmission based on the overlapping factor.

15. The method of claim 12, wherein the average number of overlapping transmissions corresponds to an average number of terminals assigned to a same group of channel sets.

16. An apparatus comprising:
    means for obtaining information used to adjust an overlapping factor indicative of an average number of overlapping transmissions; and
    means for updating the overlapping factor based on the obtained information.

17. The apparatus of claim 16, further comprising:
    means for determining at least one performance metric based on the obtained information, and wherein the means for updating the overlapping factor comprises means for updating the overlapping factor based on the at least one performance metric.

18. The apparatus of claim 16, further comprising:
    means for scheduling terminals for data transmission based on the overlapping factor.

19. The apparatus of claim 16, wherein the average number of overlapping transmissions corresponds to an average number of terminals assigned to a same group of channel sets.

20. An apparatus comprising:
a processor operative to obtain an overlapping factor, the overlapping factor being indicative of an average number of overlapping transmissions; and
a controller operative to determine transmit power for a data transmission based on the overlapping factor.

21. The apparatus of claim 20, wherein the processor is operative to detect a transmit power control (TPC) command from the base station and to provide a TPC decision, and wherein the controller is operative to determine the transmit power for the data transmission further based on the TPC decision.

22. The apparatus of claim 21, wherein the controller is operative to adjust a reference power level based on the TPC decision and to determine the transmit power for the data transmission based on the reference power level.

23. The apparatus of claim 20, wherein the processor is operative to obtain at least one indication of interference, and wherein the controller is operative to determine the transmit power for the data transmission farther based on the at least one indication of interference.

24. The apparatus of claim 23, wherein the controller is operative to adjust a transmit power delta based on the at least one indication of interference and to determine the transmit power for the data transmission further based on the transmit power delta.

25. The apparatus of claim 24, further comprising:
a channel estimator operative to estimate channel gains for the base station and the at least one neighbor base station, and wherein the controller is operative to determine the transmit power for the data transmission farther based on the channel gains.

26. The apparatus of claim 20, wherein the processor is operative to obtain a quality of service (QoS) power control parameter, and wherein the controller is operative to determine the transmit power for the data transmission further based on the QoS power control parameter.

27. The apparatus of claim 20, wherein the processor is operative to obtain a minimum transmit power delta, and wherein the controller is operative to determine the transmit power for the data transmission further based on the minimum transmit power delta.

28. A method of controlling transmit power, comprising:
obtaining an overlapping factor that is indicative of an average number of overlapping transmissions; and
determining transmit power for a data transmission based on the overlapping factor.

29. The method of claim 28, further comprising:
receiving a transmit power control (TPC) command, and wherein the determining the transmit power for the data transmission comprises determining the transmit power for the data transmission further based on the received TPC command.

30. The method of claim 28, further comprising:
obtaining at least one indication of interference observed by at least one neighbor base station, and wherein the determining the transmit power for the data transmission comprises determining the transmit power for the data transmission further based on the at least one indication of interference.

31. The method of claim 28, further comprising:
obtaining a quality of service (QoS) power control parameter f, and wherein the determining the transmit power for the data transmission comprises determining the transmit power for the data transmission further based on the QoS power control parameter.

32. An apparatus comprising:
means for obtaining an overlapping factor that is indicative of an average number of overlapping transmissions; and
means for determining transmit power for a data transmission based on the overlapping factor.

33. The apparatus of claim 32, further comprising:
means for receiving a transmit power control (TPC) command fr, and wherein the means for determining the transmit power for the data transmission comprises means for determining the transmit power for the data transmission further based on the received TPC command.

34. The apparatus of claim 33, further comprising:
means for obtaining at least one indication of interference, and wherein the means for determining the transmit power for the data transmission comprises means for determining the transmit power for the data transmission further based on the at least one indication of interference.

35. The apparatus of claim 32, further comprising:
means for obtaining a quality of service (QoS) power control parameter, and wherein the means for determining the transmit power for the data transmission comprises means for determining the transmit power for the data transmission further based on the QoS power control parameter.

36. A computer program product, comprising:
computer-readable medium, comprising:
code for causing a computer to obtain information used to adjust an overlapping factor indicative of an average number of overlapping transmissions; and
code for causing a computer to update the overlapping factor based on the obtained information.

37. The computer program product of claim 36, further comprising:
code for causing a computer to determine at least one performance metric based on the obtained information, and wherein the code for causing a computer to update the overlapping factor comprises code for causing a computer to update the overlapping factor based on the at least one performance metric.

38. The computer program product of claim 36, further comprising:
code for causing a computer to schedule terminals for data transmission based on the overlapping factor.

39. The computer program product of claim 36, wherein the average number of overlapping transmissions corresponds to an average number of terminals assigned to a same group of channel sets.

40. A computer program product, comprising:
computer-readable medium, comprising:
code for causing a computer to obtain an overlapping factor that is indicative of an average number of overlapping transmissions; and
code for causing a computer to determine transmit power for a data transmission based on the overlapping factor.

41. The computer program product of claim 40, further comprising:
code for causing a computer to receive a transmit power control (TPC) command, and wherein the code for causing a computer to determine the transmit power for the data transmission comprises code for causing a computer to determine the transmit power for the data transmission further based on the received TPC command.

42. The computer program product of claim 40, further comprising:

code for causing a computer to obtain at least one indication of interference observed by at least one neighbor base station, and wherein the code for causing a computer to determine the transmit power for the data transmission comprises code for causing a computer to determine the transmit power for the data transmission further based on the at least one indication of interference.

43. The computer program product of claim 28, further comprising:

code for causing a computer to obtain a quality of service (QoS) power control parameter f, and wherein the code for causing a computer to determine the transmit power for the data transmission comprises code for causing a computer to determine the transmit power for the data transmission further based on the QoS power control parameter.

* * * * *